(12) United States Patent
Peng et al.

(10) Patent No.: US 10,843,939 B2
(45) Date of Patent: Nov. 24, 2020

(54) ENERGY-SAVING SEAWATER DESALINATION DEVICE USING POWER GENERATED IN COMPLEMENTARY COOPERATION OF WIND ENERGY AND LIGHT ENERGY, AND CONTROL METHOD

(71) Applicant: SHANGHAI JOIN-IN TECHNOLOGIES CO., LTD., Shanghai (CN)

(72) Inventors: Tom Peng, Shanghai (CN); Yanmin Han, Shanghai (CN); Da Peng, Shanghai (CN); Jack Sun, Shanghai (CN); Jielian Zhao, Shanghai (CN); Jason Li, Shanghai (CN)

(73) Assignee: SHANGHAI JOIN-IN TECHNOLOGIES CO., LTD., Shanghai (CN)

( * ) Notice: Subject to any disclaimer, the term of this patent is extended or adjusted under 35 U.S.C. 154(b) by 0 days.

(21) Appl. No.: 16/317,710

(22) PCT Filed: Jul. 12, 2017

(86) PCT No.: PCT/CN2017/092592
§ 371 (c)(1),
(2) Date: Jan. 14, 2019

(87) PCT Pub. No.: WO2018/010660
PCT Pub. Date: Jan. 18, 2018

(65) Prior Publication Data
US 2019/0225506 A1    Jul. 25, 2019

(30) Foreign Application Priority Data
Jul. 14, 2016 (CN) .......................... 2016 1 0341518

(51) Int. Cl.
*C02F 1/04* (2006.01)
*C02F 1/14* (2006.01)
(Continued)

(52) U.S. Cl.
CPC ................ *C02F 1/047* (2013.01); *C02F 1/08* (2013.01); *C02F 1/14* (2013.01); *G05B 13/02* (2013.01);
(Continued)

(58) Field of Classification Search
CPC .... C02F 1/047; C02F 1/08; C02F 1/12; C02F 1/14; C02F 2103/08; C02F 2201/009;
(Continued)

(56) References Cited

FOREIGN PATENT DOCUMENTS

CN    201708564 U    1/2011
CN    202576048 U    12/2012
(Continued)

OTHER PUBLICATIONS

Machine translation of CN 104058473, obtained from WIPO, Sep. 2014.*
(Continued)

*Primary Examiner* — Renee Robinson
(74) *Attorney, Agent, or Firm* — Dragon Sun Law Firm PC; Jinggao Li, Esq.

(57) ABSTRACT

An energy-saving seawater desalination device using power generated in complementary cooperation of wind energy and light energy, and a control method are provided. The device comprises an electrical control cabinet, a photovoltaic power generation component, a wind power generation component, an energy storage device, an electric heater, etc. The present invention supplies power for power loads of a seawater desalination system through solar power generation and wind power generation in a grid-connected system, and cooperates with the traditional power grid to maximize and
(Continued)

localize the utilization of new energy power and reduce the waste of resources. In an off-grid system, the photovoltaic power generation component and the wind power generation component convert redundant power into other forms of energy resources for energy storage through a battery or an electric heater under the condition that the generating capacity is enough. When the generating capacity is not enough, the loads are allocated to avoid the waste of energy as much as possible.

13 Claims, 5 Drawing Sheets

(51) Int. Cl.
*H02S 10/12* (2014.01)
*G05B 13/02* (2006.01)
*C02F 1/08* (2006.01)
*C02F 1/12* (2006.01)
*C02F 103/08* (2006.01)

(52) U.S. Cl.
CPC ............... *H02S 10/12* (2014.12); *C02F 1/12* (2013.01); *C02F 2103/08* (2013.01); *C02F 2201/009* (2013.01); *C02F 2209/005* (2013.01); *Y02A 20/128* (2018.01); *Y02A 20/129* (2018.01); *Y02A 20/141* (2018.01); *Y02A 20/142* (2018.01); *Y02A 20/212* (2018.01)

(58) Field of Classification Search
CPC ............ C02F 2209/005; Y02A 20/129; Y02A 20/141; Y02A 20/142
See application file for complete search history.

(56) References Cited

FOREIGN PATENT DOCUMENTS

| CN | 103149916 A | 6/2013 |
| CN | 104058473 A | 9/2014 |
| CN | 105589331 A | 5/2016 |
| CN | 105905968 A | 8/2016 |
| CN | 205773471 U | 12/2016 |
| WO | WO 2010063633 A1 | 6/2010 |

OTHER PUBLICATIONS

Machine translation of CN 105589331, obtained from WIPO, May 2016.*

Machine translation of CN 202576048, obtained from WIPO, Dec. 2012.*

* cited by examiner

ENERGY-SAVING SEAWATER DESALINATION DEVICE USING POWER GENERATED IN COMPLEMENTARY COOPERATION OF WIND ENERGY AND LIGHT ENERGY, AND CONTROL METHOD

TECHNICAL FIELD

The present invention relates to seawater desalination equipment, and in particular to an energy-saving seawater desalination device using power generated in complementary cooperation of wind energy and light energy and a control method.

BACKGROUND

Seawater desalination technologies mainly include thermal drive and membrane drive. The bottleneck of thermal drive is large consumption of energy. Using solar energy as clean energy to provide heat energy for seawater desalination is an important measure to save energy and reduce emission. Solar and wind resources are abundant and have good complementarity. In islands with scarce fresh water resources, there is an urgent need for fresh water, and the seawater around the islands is of good quality and is suitable for seawater desalination. Therefore, it is one of the important research and development directions for the comprehensive development of island resources to use solar energy, wind energy and other new energy sources to supply power for the operation of seawater desalination. It is well-known that, solar power generation and wind power generation have unstable factors, while the normal operation of a seawater desalination device requires a more stable power supply. One of the important topics of research on seawater desalination technologies at present is how to make full use of solar and wind resources, make reasonable matching and scheduling and cooperate with the traditional power grid to realize the optimal utilization of new energy sources in the field of seawater desalination.

SUMMARY

The technical problem to be solved by the present invention is to supply power for seawater desalination equipment through solar power generation and wind power generation and cooperate with the traditional power grid to conduct optimal utilization of electric energy and reduce the waste of resources.

To solve the above technical problem, the present invention discloses an energy-saving seawater desalination device using power generated in complementary cooperation of wind energy and light energy. The technical solution of the present invention is implemented as follows:

an energy-saving seawater desalination device using power generated in complementary cooperation of wind energy and light energy comprises a solar heat collector, a seawater desalination component and an energy storage device, wherein the seawater desalination component comprises a seawater desalination device, transportation equipment, a medium storage container and an electric heater; the seawater desalination device comprises a barrel body, a spray device arranged in the barrel body and a falling film evaporator; the transportation equipment comprises a seawater pump, a vacuum pump, a seawater spray pump, a concentrated salt water pump, a water supply pump, a circulating pump and a fresh water pump; the medium storage container comprises a concentrated brine tank, a fresh water tank and an original water return tank; and the energy-saving seawater desalination device further comprises:

an electrical control cabinet electrically connected to an external grid supply line and supplying power for the transportation equipment and the electric heater through a plurality of power output ends;

a photovoltaic power generation component comprising a plurality of solar photovoltaic panels arranged in a matrix and provided with a first inverter disposed between the electrical control cabinet and the solar photovoltaic panels, wherein the alternating current output end of the first inverter is electrically connected to the electrical control cabinet and the direct current input end of the first inverter is electrically connected to the solar photovoltaic panels; and wind power generation components comprising a plurality of generators driven by windward impellers and provided with wind power generation controllers and second inverters in sequence between the wind power generation components and the electrical control cabinet, wherein the wind power generation controllers are used for rectifying and filtering the output current of the generators and providing direct current for the direct current input ends of the second inverters and the alternating current output ends of the second inverters are electrically connected to the electrical control cabinet.

Preferably, the photovoltaic power generation component also comprises a direct current convergence box; the direct current convergence box is used for connecting all the solar photovoltaic panels in parallel; a positive terminal of the direct current convergence box is electrically connected with the positive terminal of the direct current input end; and a negative terminal of the direct current convergence box is electrically connected with the negative terminal of the direct current input end.

Preferably, a battery component is connected beside the wind power generation controllers; and the battery component is used for storing electric energy emitted by a wind power generator.

Preferably, a plurality of wind power generation components are arranged; and the second inverter and the wind power generation controller are arranged in each loop formed by each wind power generation component and the electrical control cabinet.

Preferably, each wind power generation controller comprises a diode bridge rectifier and a filtering capacitor.

Preferably, the energy-saving seawater desalination device using power generated in complementary cooperation of wind energy and light energy also comprises a light intensity sensor; the electrical control cabinet is provided with an electric control unit; the light intensity sensor is used for sensing the sunlight intensity; the light intensity sensor is in communication connection with the electric control unit; an electric power measuring instrument is arranged in a power supply loop between the electrical control cabinet and the wind power generation component; the electric power measuring instrument is in communication connection with the electric control unit; and the electric power measuring instrument is used for the electric control unit to obtain real-time generation power data of the wind power generation component.

A power supply control method of an energy-saving seawater desalination device using power generated in complementary cooperation of wind energy and light energy comprises the following steps:

S1: the electric control unit respectively senses the real-time generation power $P_{pv}$ of the photovoltaic power generation component through a signal obtained by sampling in unit time, and senses real-time light radiation intensity through the light intensity sensor; A and B are respectively set as two critical light radiation intensity values set in the electric control unit, and A is less than B;

S2: if the real-time light radiation intensity is greater than or equal to B, the photovoltaic power generation component is connected to a power grid and supplies power for the energy-saving seawater desalination device using power generated in complementary cooperation of wind energy and light energy; if not, S3 or S5 is executed;

S3: if the real-time light radiation intensity is greater than or equal to A and is less than B, the photovoltaic power generation component is disconnected from the power grid and then S41 or S42 is executed;

S41: if sufficient heat is stored in the current external heat collecting device, the electric control unit issues an instruction to enable the photovoltaic power generation component to supply power for the transportation equipment in accordance with a self-matching method of output power and power load;

S42: if insufficient heat is stored in the current external heat collecting device, the electric control unit issues an instruction to enable the photovoltaic power generation component to supply power for the external electric heater only;

S5: if the real-time light radiation intensity is less than B, the photovoltaic power generation component cuts off all external power supplies.

Preferably, the electric control unit senses the real-time generation power $P_{wind}$ of the wind power generation component through a signal obtained by sampling in unit time; $P_{(n)}$ and $P_{(n-1)}$ are set as generation power values of the wind power generation component 42 sensed by two adjacent time nodes; $P_{(n)}$ is the value measured by the latter time node; E1 is set as a primary deviation threshold stored in the electric control unit and used for reflecting a value difference between $P_{(n)}$ and $P_{(n-1)}$; E2 is set as a secondary deviation threshold stored in the electric control unit and used for reflecting a value difference between $P_{(n)}$ and $P_{(n-1)}$; E1 is less than E2 if the following cases are satisfied:

if an absolute value dp of $P_{(n)}-P_{(n-1)}$ is 0, the electric control unit keeps an original PWM duty cycle waveform signal for a transmission and distribution component arranged in the electrical control cabinet;

if 0<dp<E1, the electric control unit adjusts the sampling time node into 3 times of the unit time; if dp is resumed to 0, the sampling time node is resumed into 1 time of the unit time;

if E1<dp<E2, the electric control unit adjusts the sampling time node into 5 times of the unit time, and if dp<E1 is resumed, the sampling time node is resumed into 3 times of unit time.

Preferably, in the self-matching method of output power and power load, the loads of the energy-saving seawater desalination device using power generated in complementary cooperation of wind energy and light energy are classified into the following three types according to use frequency:

I. the loads belonging to continuous service comprise the circulating pump and the water supply pump; and $P_C$ is set as the power sum of the loads belonging to continuous service;

II. the loads belonging to intermittent operation comprise a primary effect condensate and return pump, a product water pump, an evaporator circulating pump, a cooling water discharge pump, a raw material water pump, a concentrated brine discharge pump, an overheat eliminating pump and a submersible pump; and $P_I$ is set as the power sum of the loads belonging to intermittent operation;

III. the loads belonging to operation for one time only after start comprise a water ring vacuum pump; and $P_O$ is set as the power sum of the loads belonging to operation for one time only after start;

IV. the loads belonging to ready-to-use state comprise the electric heater; and $P_B$ is set as the power sum of the loads belonging to ready-to-use state; and the $P_t$ value of the sum of the supply power of the wind power generation component and the supply power of the photovoltaic power generation component is 1.2-1.5 times of $P_C+P_I+P_O$; in control operation of closing and resuming the work of the loads at all levels in sequence, the constraint is based on the algebraic formula $P_t=N*(P_C+P_I+P_O)$; and N is any real number in an interval of 1.2-1.5.

Preferably, a critical light radiation intensity value A is 200 W/m$^2$; a critical light radiation intensity value B is 500 W/m$^2$; unloading is conducted in sequence according to levels I, II and III of the use frequency of all the loads; and a plurality of loads in the same level are unloaded in sequence.

Preferably, the control method comprises the following steps:

S1: the electric control unit respectively senses the real-time generation power $P_{pv}$ of the photovoltaic power generation component through a signal obtained by sampling in unit time, and senses real-time light radiation intensity through the light intensity sensor; A and B are respectively set as two critical light radiation intensity values set in the electric control unit, and A is less than B;

S2: if the real-time light radiation intensity is greater than or equal to B, the photovoltaic power generation component is connected to the battery component and supplies power for the energy-saving seawater desalination device using power generated in complementary cooperation of wind energy and light energy; if not, S3 or S5 is executed;

S3: if the real-time light radiation intensity is greater than or equal to A and is less than B, the photovoltaic power generation component is disconnected from the battery component and then S41 or S42 is executed;

S41: if sufficient heat is stored in the current external heat collecting device, the electric control unit issues an instruction to enable the photovoltaic power generation component to supply power for the transportation equipment in accordance with a self-matching method of output power and power load;

S42: if insufficient heat is stored in the current external heat collecting device, the electric control unit issues an instruction to enable the photovoltaic power generation component to supply power for the external electric heater only;

S5: if the real-time light radiation intensity is less than B, the photovoltaic power generation component cuts off all external power supplies.

In the self-matching method of output power and power load, the loads of the energy-saving seawater desalination device using power generated in complementary cooperation of wind energy and light energy are classified into the following three types according to use frequency:

I. the loads belonging to continuous service comprise the circulating pump and the water supply pump; and $P_C$ is set as the power sum of the loads belonging to continuous service;

II. the loads belonging to intermittent operation comprise a primary effect condensate and return pump, a product water pump, an evaporator circulating pump, a cooling water discharge pump, a raw material water pump, a concentrated brine discharge pump, an overheat eliminating pump and a submersible pump; and $P_I$ is set as the power sum of the loads belonging to intermittent operation;

III. the loads belonging to operation for one time only after start comprise a water ring vacuum pump; and $P_O$ is set as the power sum of the loads belonging to operation for one time only after start;

IV. the loads belonging to ready-to-use state comprise the electric heater; and $P_B$ is set as the power sum of the loads belonging to ready-to-use state; and unloading is conducted in sequence according to levels IV, III, II and I of the use frequency of all the loads; and a plurality of loads in the same level are unloaded in sequence.

Preferably, the control method further comprises: S6: the photovoltaic power generation component and the wind power generation component are operated, and step S7 or S8 is executed;

S7: if $P_t > P_C + P_I + P_O$, only the photovoltaic power generation component supplies power for the transportation load and redundant electric energy is converted into heat energy through the electric heater; the wind power generation component charges the battery component;

S8: if $P_t < P_C + P_I + P_O$, whether the electric heater is loaded is detected; if so, the electric heater is cut off; if not, step S9 is executed;

S9: whether the battery component has sufficient power is detected; if so, the battery component is connected; the battery component and the photovoltaic power generation component jointly supply power for the transportation load; the wind power generation component charges the battery component; redundant electric energy is converted into heat energy through the electric heater; if not, step S10 is executed; and S10: unloading is conducted in sequence according to levels IV, III, II and I of the use frequency of all the loads; and a plurality of loads in the same level are unloaded in sequence.

Preferably, the control method also comprises a load adaptive control method:

the supply power and the load power are detected continuously and circularly in real time; if the sum of the supply power of the photovoltaic power generation component and the supply power of the wind power generation component is $P_t$ and the load power is $L_D = P_C + P_I + P_O + P_B$, it is assumed that the load power is changed to $L_D'$ after this adaptive control; a deviation threshold E is set on this basis; then the adaptive control needs to satisfy the following conditions:

if $P_t - L_D > E$, new loads are loaded; the sum of the power of the new loads is $L_n$, and $L_D' = L_D + L_n$, $|P_t - L_D'| < E$;

if $P_t - L_D < E$, unloading is conducted in sequence according to levels IV, III, II and I of the use frequency of all the loads; a plurality of loads in the same level are unloaded in sequence; the sum of the power of the unloaded loads is $L_x$; and $L_D' = L_D - L_x$, $|P_t - L_D'| < E$; and if $|Pt - LD| < E$, then $L_D' = L_D$.

The present invention has the following beneficial effects:

1. Wind power generation and photovoltaic power generation are used to supply power for transportation equipment such as the seawater pump, the fresh water pump, the concentrated salt water pump, the water supply pump, etc. in real time in the process of seawater desalination, so as to reduce dependence on external power grids.

2. When wind energy and solar energy fail to achieve the operating conditions of the seawater desalination device, a switch in a wind power generation controller is used to switch to enable the battery component to charge. When charging is sufficient, the above transportation equipment is powered again, so as to fully maximize and localize the utilization of redundant clean energy.

3. Real-time power supply output power is monitored and intelligently regulated, to achieve intelligent power supply and avoid interference.

DESCRIPTION OF DRAWINGS

To more clearly describe the technical solutions in the embodiments of the present invention or in prior art, the drawings required to be used in the description of the embodiments or the prior art will be simply presented below. Apparently, the drawings in the following description are merely some embodiments of the present invention, and for those skilled in the art, other drawings can also be obtained according to these drawings without contributing creative labor.

Figure 1:
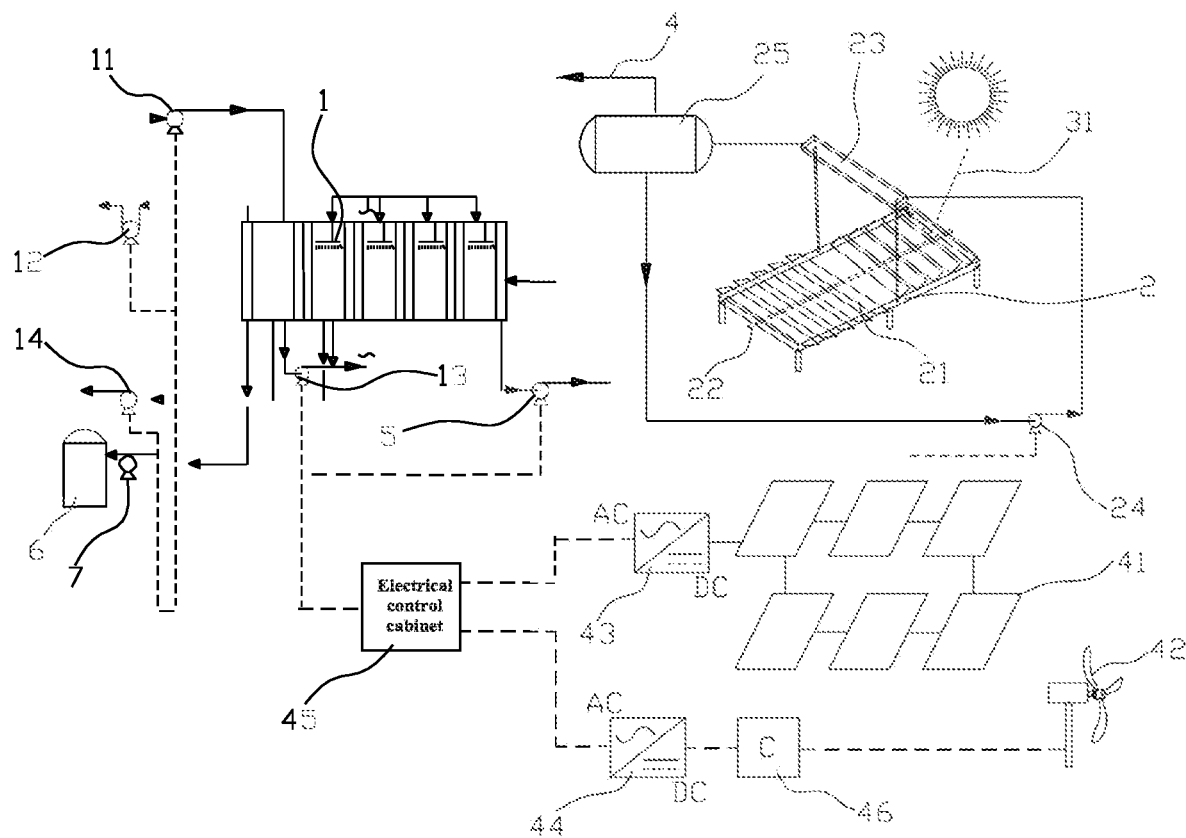
FIG. 1 is a structural schematic diagram of an energy-saving seawater desalination device using power generated in complementary cooperation of wind energy and light energy in the present invention.

In the figures: 1 spray evaporator; 11 seawater pump; 12 vacuum pump; 13 seawater spray pump; 14 concentrated salt water pump; 2 reflective focusing solar photothermal device; 21 reflector; 22 automatic tracking solar device; 23 heat collecting device; 24 circulating pump; 25 steam generator; 31 incident sunlight; 4 main steam pipe; 41 photovoltaic power generation component; 42 wind power generation component; 43 first inverter; 44 second inverter; 45 electrical control cabinet; 46 wind power generation controller; 5 water supply pump; 6 fresh water storage tank; 7 fresh water pump; and 50 electric heater.

DETAILED DESCRIPTION

The technical solution in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

As shown in FIG. 1 to FIG. 4, the energy-saving seawater desalination device using power generated in complementary cooperation of wind energy and light energy in the present invention comprises a solar heat collector, a seawater desalination component and an energy storage device. The seawater desalination component comprises a seawater desalination device, transportation equipment, a medium storage container and an electric heater; the seawater desalination device comprises a barrel body, a spray device arranged in the barrel body and a falling film evaporator; the transportation equipment comprises a seawater pump 11, a vacuum pump 12, a seawater spray pump 13, a concentrated salt water pump 14, a water supply pump 5, a circulating pump 24 and a fresh water pump 7; the medium storage container comprises a concentrated brine tank, a fresh water tank and an original water return tank; and the energy-saving seawater desalination device using power generated in complementary cooperation of wind energy and light energy also comprises an electrical control cabinet 45, a photovoltaic power generation component 41 and a wind power generation component 42.

The energy storage device may be a battery, an electric heater, etc. which can convert redundant power into other forms of energy resources for storage for use.

Figure 2:
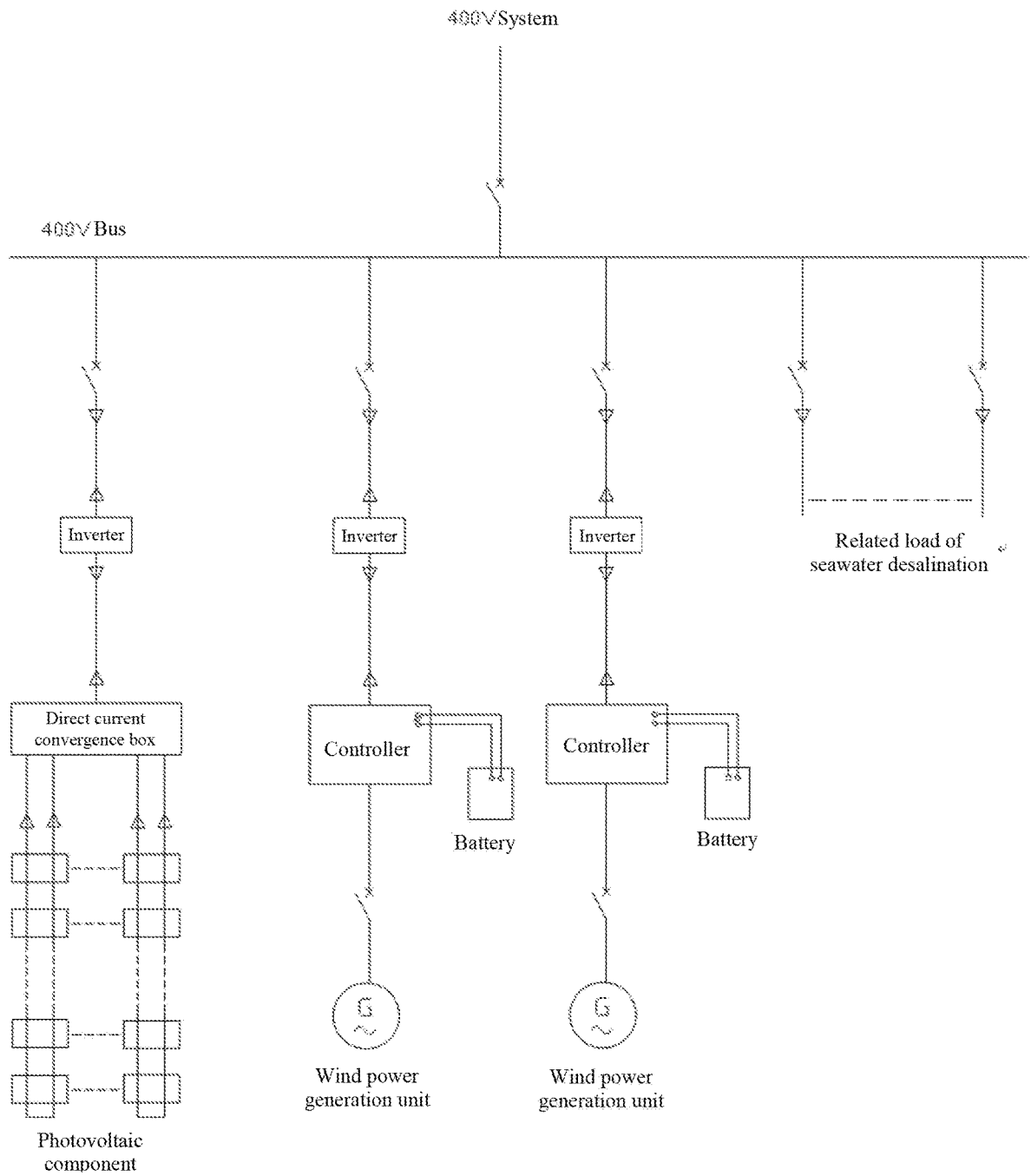
FIG. 2 is an electrical principle diagram of a preferred embodiment of the present invention.
Figure 3:
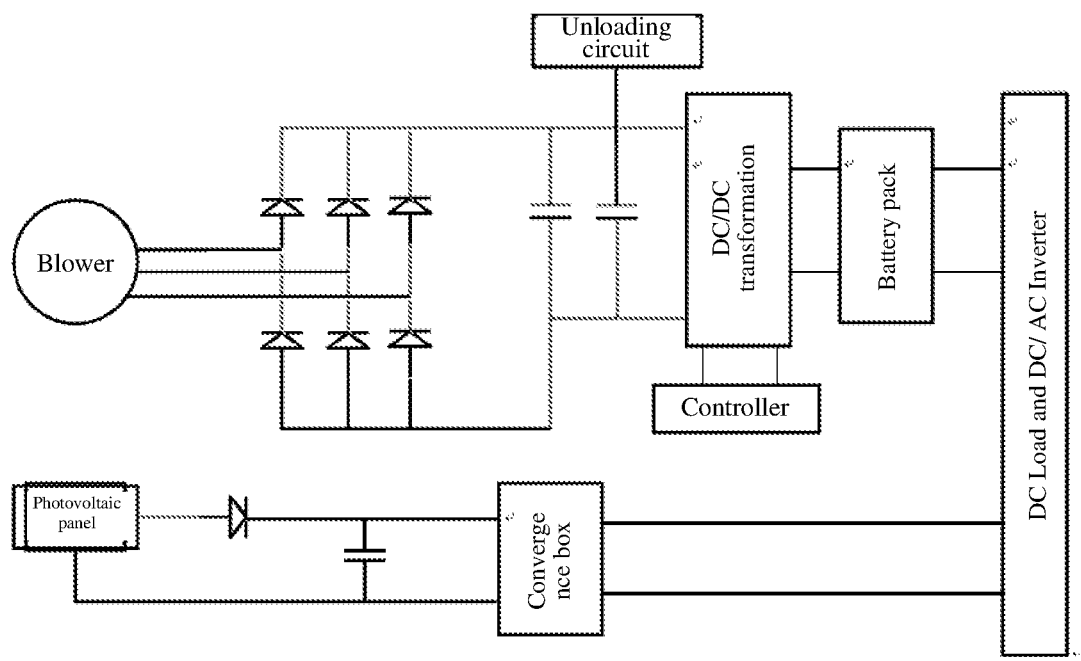
FIG. 3 is an electrical principle diagram of another preferred embodiment of the present invention.
Figure 4:
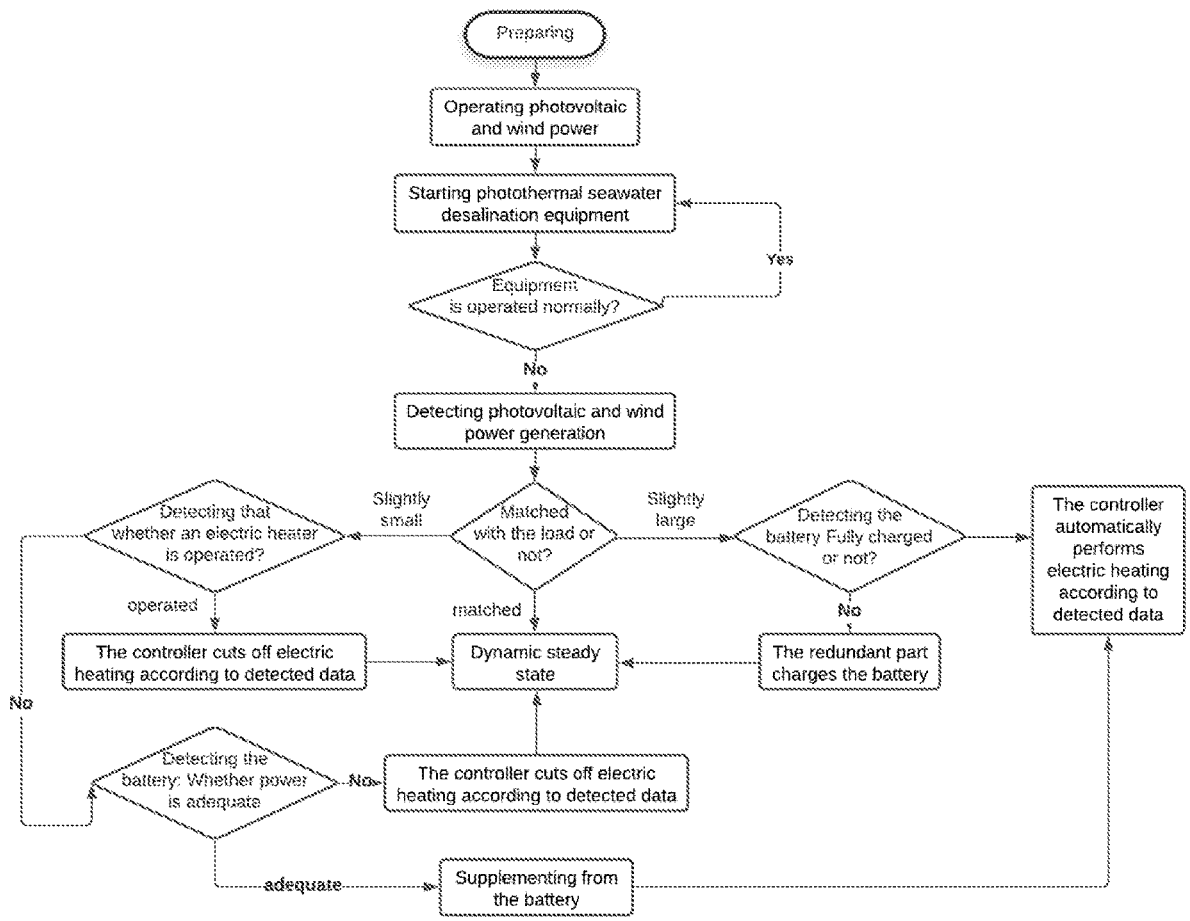
FIG. 4 is a flow chart of a control method of the present invention in one embodiment.

As shown in FIG. 2, the electrical control cabinet 45 is electrically connected to an external grid supply line through a conducting wire. The power grid is an AC power supply of 400V. The electrical control cabinet 45 supplies power for the transportation equipment, such as the seawater pump 11, the vacuum pump 12, the seawater spray pump 13, the concentrated salt water pump 14, the water supply pump 5, the circulating pump 24 and the fresh water pump 7, and the electric heater through a plurality of power output ends.

Specifically, as shown by the following table, the type of the transportation equipment in the present invention may be not limited to the above listed, and can be increased and decreased according to actual conditions. On the other hand, the following table successively lists single power and quantity corresponding to each of load equipment.

The following is a statistical table of load equipment attribute classification in the seawater desalination system.

between the wind power generation component 42 and the electrical control cabinet 45. The wind power generation controllers 46 are used for rectifying and filtering the output current of the generators and providing direct current for the direct current input ends of the second inverters 44 and the alternating current output ends of the second inverters 44 are electrically connected to the electrical control cabinet 45.

In order to make the electric energy generated by photovoltaic power generation more stable and temporarily stored when the outputted electric energy fails to meet the operating conditions of the seawater desalination device, as a preferred solution, the photovoltaic power generation component 41 also comprises a direct current convergence box; the direct current convergence box is used for connecting all the solar photovoltaic panels in parallel; a positive terminal of the direct current convergence box is electrically connected with the positive terminal of the direct current input end; and a negative terminal of the direct current convergence box is electrically connected with the negative terminal of the direct current input end.

In order to make the electric energy outputted by wind power generation temporarily stored when failing to meet the operating conditions of the seawater desalination device, as a preferred solution, a battery component is connected beside the wind power generation controllers; and the battery component is used for storing electric energy emitted by a wind power generator included in the wind power generation component 42.

| Attribute | Equipment Name | Power | Quantity | Power Statistics |
|---|---|---|---|---|
| Continuous service (I) | Circulating pump | P1 | N1 | $P_C = P1 * N1 + P2 * N2 + \ldots$ |
| | Water supply pump | P2 | N2 | |
| | ... | ... | ... | |
| Intermittent operation (II) | Primary effect condensate and return pump | P3 | N3 | $P_I = P3 * N3 + P4 * N4 + \ldots + P10 * N10 + \ldots$ |
| | Product water pump | P4 | N4 | |
| | Evaporator circulating pump | P5 | N5 | |
| | Cooling water discharge pump | P6 | N6 | |
| | Raw material water pump | P7 | N7 | |
| | Concentrated brine discharge pump | P8 | N8 | |
| | Overheat eliminating pump | P9 | N9 | |
| | Submersible pump | P10 | N10 | |
| Operation for one time after start (III) | Water ring vacuum pump | P11 | N11 | $P_O = P11 * N11 + \ldots$ |
| | ... | ... | ... | |
| Ready-to-use (IV) | Electric heater | P12 | N12 | $P_B = P12 * N12 + \ldots$ |
| | ... | ... | ... | |

The photovoltaic power generation component 41 of the present invention comprises a plurality of solar photovoltaic panels arranged in a matrix and provided with a first inverter 43 disposed between the electrical control cabinet 45 and the solar photovoltaic panels. The alternating current output end of the first inverter 43 is electrically connected to the electrical control cabinet 45 and the direct current input end of the first inverter 43 is electrically connected to the solar photovoltaic panels.

The wind power generation component 42 of the present invention comprises a plurality of generators driven by windward impellers and provided with wind power generation controllers 46 and second inverters 44 in sequence As a preferred solution, a plurality of wind power generation components 42 are arranged; and the second inverter 44 and the wind power generation controller 46 are arranged in each loop formed by each wind power generation component 42 and the electrical control cabinet 45.

In order to make the direct current provided by the wind power generation components more stable, as a preferred solution, each wind power generation controller 46 comprises a diode bridge rectifier and a filtering capacitor.

As a preferred solution, the energy-saving seawater desalination device using power generated in complementary cooperation of wind energy and light energy also comprises a light intensity sensor; the electrical control cabinet 45 is provided with an electric control unit; the light intensity sensor is in communication connection with the electric control unit; an electric power measuring instrument is arranged in a power supply loop between the electrical control cabinet 45 and the wind power generation component 42; the electric power measuring instrument is in communication connection with the electric control unit; and the electric power measuring instrument is used for the electric control unit to obtain real-time generation power data of the wind power generation component 42.

Specifically, a power supply control method of the energy-saving seawater desalination device using power generated in complementary cooperation of wind energy and light energy comprises the following steps:

S1: the electric control unit respectively senses the real-time generation power $P_{pv}$ of the photovoltaic power generation component 41 through a signal obtained by sampling in unit time, and senses real-time light radiation intensity through the light intensity sensor; A and B are respectively set as two critical light radiation intensity values set in the electric control unit, and A is less than B;

S2: if the real-time light radiation intensity is greater than or equal to B, the photovoltaic power generation component 41 is connected to a power grid and supplies power for the energy-saving seawater desalination device using power generated in complementary cooperation of wind energy and light energy; if not, S3 or S5 is executed;

S3: if the real-time light radiation intensity is greater than or equal to A and is less than B, the photovoltaic power generation component 41 is disconnected from the power grid and then S41 or S42 is executed;

S41: if sufficient heat is stored in the current external heat collecting device, the electric control unit issues an instruction to enable the photovoltaic power generation component 41 to supply power for the transportation equipment in accordance with a self-matching method of output power and power load;

S42: if insufficient heat is stored in the current external heat collecting device, the electric control unit issues an instruction to enable the photovoltaic power generation component 41 to supply power for the external electric heater only;

S5: if the real-time light radiation intensity is less than B, the photovoltaic power generation component 41 cuts off all external power supplies.

As a preferred solution, the electric control unit senses the real-time generation power $P_{wind}$ of the wind power generation component through a signal obtained by sampling in unit time; $P_{(n)}$ and $P_{(n-1)}$ are set as generation power values of the wind power generation component 42 sensed by two adjacent time nodes; $P_{(n)}$ is the value measured by the latter time node; E1 is set as a primary deviation threshold stored in the electric control unit and used for reflecting a value difference between $P_{(n)}$ and $P_{(n-1)}$; E2 is set as a secondary deviation threshold stored in the electric control unit and used for reflecting a value difference between $P_{(n)}$ and $P_{(n-1)}$; E1 is less than E2 if the following cases are satisfied:

if an absolute value dp of $P_{(n)}-P_{(n-1)}$ is 0, the electric control unit keeps an original PWM duty cycle waveform signal for a transmission and distribution component arranged in the electrical control cabinet 45;

if 0<dp<E1, the electric control unit adjusts the sampling time node into 3 times of the unit time; if dp is resumed to 0, the sampling time node is resumed into 1 time of the unit time;

if E1<dp<E2, the electric control unit adjusts the sampling time node into 5 times of the unit time, and if dp<E1 is resumed, the sampling time node is resumed into 3 times of unit time; and if dp>E2, the electric control unit issues an instruction to adjust the PWM duty cycle waveform signal for the transmission and distribution component arranged in the electrical control cabinet 45.

This design can avoid interference caused by minor deviation or transient deviation. At the same time, the electronic control unit will not ignore the substantial and significant changes in the input power value and will adjust the working efficiency of the transportation equipment in work in time.

Specifically, in a preferred embodiment of the present invention, a load control method of the energy-saving seawater desalination device using power generated in complementary cooperation of wind energy and light energy is applied, and the loads of the energy-saving seawater desalination device using power generated in complementary cooperation of wind energy and light energy are classified into the following three types according to use frequency:

I. the loads belonging to continuous service comprise the circulating pump and the water supply pump; and $P_C$ is set as the power sum of the loads belonging to continuous service;

II. the loads belonging to intermittent operation comprise a primary effect condensate and return pump, a product water pump, an evaporator circulating pump, a cooling water discharge pump, a raw material water pump, a concentrated brine discharge pump, an overheat eliminating pump and a submersible pump; and $P_I$ is set as the power sum of the loads belonging to intermittent operation;

III. the loads belonging to operation for one time only after start comprise a water ring vacuum pump; and $P_O$ is set as the power sum of the loads belonging to operation for one time only after start; and IV. the loads belonging to ready-to-use state comprise the electric heater; and $P_B$ is set as the power sum of the loads belonging to ready-to-use state; and the $P_t$ value of the sum of the supply power of the wind power generation component and the supply power of the photovoltaic power generation component is 1.2-1.5 times of $P_C+P_I+P_O$. For example, the real-time generating power of the wind power generation component and the photovoltaic power generation component is P'; P' is a variable; and the load power $P_C+P_I+P_O$ of all of the current transportation equipment is kept between (P'/1.5) and (P'/1.2).

The purpose of this arrangement is to maintain the normal operation of the transportation equipment that has not been closed at present, and to judge whether to continue to close the load or restore the load according to the numerical formula.

As a preferred solution, a critical light radiation intensity value A is 200 W/m$^2$; and a critical light radiation intensity value B is 500 W/m$^2$. Unloading is conducted in sequence according to levels I, II and III of the use frequency of all the loads; and a plurality of loads in the same level are unloaded in sequence.

In a preferred embodiment, the power supply control method of the energy-saving seawater desalination device using power generated in complementary cooperation of wind energy and light energy in an off-grid system comprises the following steps: S1: the electric control unit respectively senses the real-time generation power $P_{pv}$ of the photovoltaic power generation component 41 through a signal obtained by sampling in unit time, and senses real-time light radiation intensity through the light intensity sensor; A and B are respectively set as two critical light radiation intensity values set in the electric control unit, and A is less than B; S2: if the real-time light radiation intensity is greater than or equal to B, the photovoltaic power generation component 41 is connected to the battery component and supplies power for the energy-saving seawater desalination device using power generated in complementary cooperation of wind energy and light energy; if not, S3 or S5 is executed; S3: if the real-time light radiation intensity is greater than or equal to A and is less than B, the photovoltaic power generation component 41 is disconnected from the battery component and then S41 or S42 is executed; S41: if sufficient heat is stored in the current external heat collecting device, the electric control unit issues an instruction to enable the photovoltaic power generation component 41 to supply power for the transportation equipment in accordance with a self-matching method of output power and power load; S42: if insufficient heat is stored in the current external heat collecting device, the electric control unit issues an instruction to enable the photovoltaic power generation component 41 to supply power for the external electric heater only; S5: if the real-time light radiation intensity is less than B, the photovoltaic power generation component 41 cuts off all external power supplies. In the self-matching method of output power and power load, the loads of the energy-saving seawater desalination device using power generated in complementary cooperation of wind energy and light energy are classified into the following three types according to use frequency: I. the loads belonging to continuous service comprise the circulating pump and the water supply pump; and $P_C$ is set as the power sum of the loads belonging to continuous service; II. the loads belonging to intermittent operation comprise a primary effect condensate and return pump, a product water pump, an evaporator circulating pump, a cooling water discharge pump, a raw material water pump, a concentrated brine discharge pump, an overheat eliminating pump and a submersible pump; and $P_I$ is set as the power sum of the loads belonging to intermittent operation; III. the loads belonging to operation for one time only after start comprise a water ring vacuum pump; and $P_O$ is set as the power sum of the loads belonging to operation for one time only after start; IV. the loads belonging to ready-to-use state comprise the electric heater; and $P_B$ is set as the power sum of the loads belonging to ready-to-use state; and unloading is conducted in sequence according to levels IV, III, II and I of the use frequency of all the loads; and a plurality of loads in the same level are unloaded in sequence.

In a preferred embodiment, the power supply control method of the energy-saving seawater desalination device using power generated in complementary cooperation of wind energy and light energy also comprises the following steps: S6: the photovoltaic power generation component 41 and the wind power generation component 42 are operated, and step S7 or S8 is executed; S7: if $P_{pv}>P_C+P_I+P_O$, only the photovoltaic power generation component 41 supplies power for the transportation load and redundant electric energy is converted into heat energy through the electric heater; the wind power generation component 42 charges the battery component; S8: if $P_{pv}<P_C+P_I+P_O$, whether the electric heater is operated is detected; if so, the electric heater is cut off; if not, step S9 is executed; S9: whether the battery component has sufficient power is detected; if so, the battery component is connected; the battery component and the photovoltaic power generation component 41 jointly supply power for the transportation load; the wind power generation component 42 charges the battery component; redundant electric energy is converted into heat energy through the electric heater; if not, step S10 is executed; and S10: unloading is conducted in sequence according to levels IV, III, II and I of the use frequency of all the loads; and a plurality of loads in the same level are unloaded in sequence.

In the off-grid system, when photovoltaic power generation is sufficient and surplus, in order not to cause energy waste, the photovoltaic power generation components are connected to the battery component. While supplying power to the seawater desalination device, the redundant power is charged to the battery component for energy storage, so that the battery component can continuously supply power to the seawater desalination device when the power generation is insufficient.

According to the real-time matching relationship between the total power load of the wind power generation and the photovoltaic power generation and the total load of the seawater desalination device, real-time cycle detection is carried out automatically. Compared with the traditional new energy that dispatches the supply of new energy power according to the load power demand, there may be different ways to unload new energy for power generation when the load demand is low, so as to avoid the phenomenon of abandoning wind or light. According to the fluctuation of new energy (wind and photovoltaic) power generation, the transportation loads in seawater desalination can be automatically loaded or unloaded, so as to form the maximum and local application of new energy power.

Figure 5:
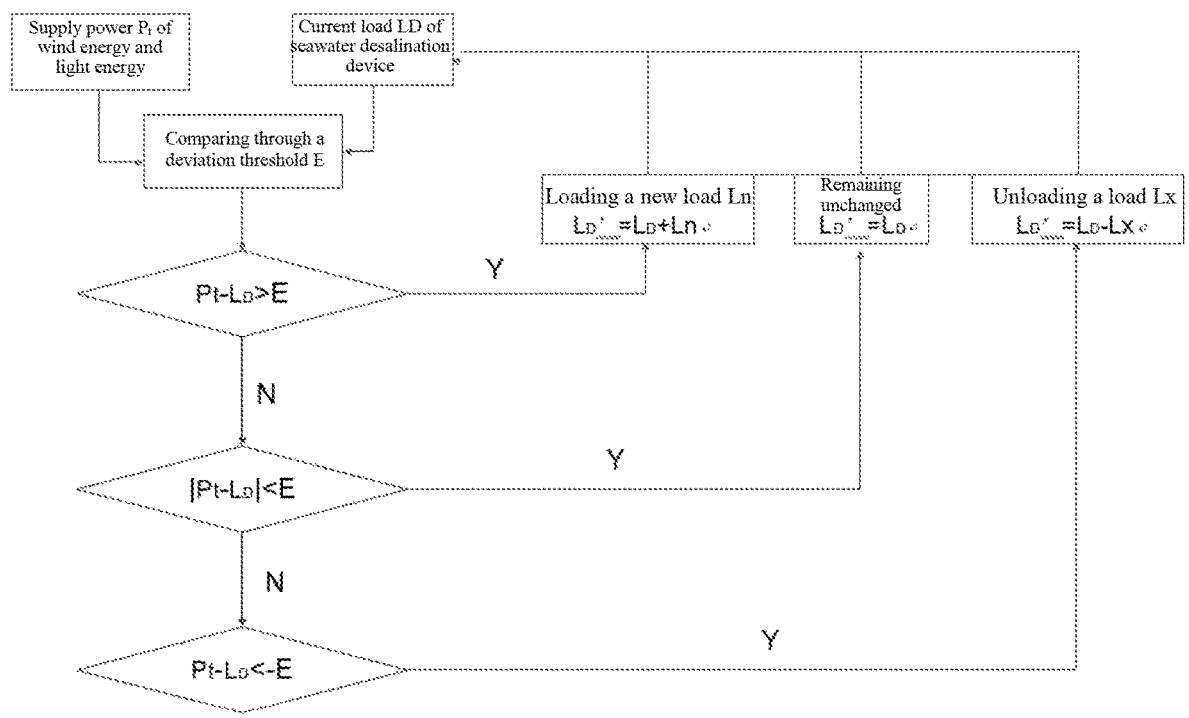
FIG. 5 is a flow chart of an adaptive control method in one embodiment.

In a preferred embodiment, the control method also comprises a load adaptive control method: the supply power and the load power are detected continuously and circularly in real time; if the sum of the supply power of the photovoltaic power generation component and the supply power of the wind power generation component is $P_t$ and the load power is $L_D=P_C+P_I+P_O+P_B$, it is assumed that the load power is changed to $L_D'$ after this adaptive control; a deviation threshold E is set on this basis; then the adaptive control needs to satisfy the following conditions: if $P_t-L_D>E$, new loads are loaded; the sum of the power of the new loads is $L_n$, and $L_D'=L_D+L_n$, $|P_t-L_D'|<E$; if $P_t-L_D<E$, unloading is conducted in sequence according to levels IV, III, II and I of the use frequency of all the loads; a plurality of loads in the same level are unloaded in sequence; the sum of the power of the unloaded loads is $L_x$; and $L_D'=L_D-L_x$, $|P_t-L_D'|<E$; and if $|P_t-L_D|<E$, then $L_D'=L_D$. The above circular execution process can be understood with reference to FIG. 5. Considering the instability of wind power generation and photovoltaic power generation, real-time dynamic detection is carried out on the power sum of wind power generation and photovoltaic power generation, and the current load power is compared with the real-time power sum of wind power generation and photovoltaic power generation. According to the deviation, the operation of loading a new load or unloading an original part of the load or keeping the load unchanged is performed to ensure the dynamic balance of the energy supply of the system and the stable operation of the seawater desalination device.

It needs to be explained that the power of the photovoltaic power generation can be expressed by $P_{light}$ or $P_{pv}$, the power of wind power generation can be expressed by $P_{air}$ or $P_{wind}$, the sum of the supply power of the wind power generation components and the supply power of the photovoltaic power generation components can be expressed by $P_{sum}$, $P_{total}$ or $P_t$, the sum of the power of the loads belonging to continuous service can be expressed by $P_C$ or $P_c$, the sum of the power of the loads belonging to intermittent operation can be expressed by $P_I$ or $P_i$, the sum of the power of the loads belonging to operation for only one time after start can be expressed by $P_O$ or $P_o$, and the sum of the power of the loads belonging to ready-to-use state can be expressed by $P_B$ or $P_b$. When the listed code names used refer to the same name of physical quantity, there might be various foot mark changes (such as case sensitive change of the same letter, or languages in different countries used in foot marks), but they belong to the field which can be easily understood by those skilled in the art by combining the context and the prior art.

It should be noted that all embodiments described above are just preferred embodiments of the present invention and are not intended to limit the present invention. Any modification, equivalent replacement, improvement, etc. made within the spirit and the principle of the present invention shall be contained within the protection scope of the present invention.

The invention claimed is:

1. An energy-saving seawater desalination device using power generated in complementary cooperation of wind energy and light energy, comprising a solar heat collector, a seawater desalination component and an energy storage device, wherein the seawater desalination component comprises a seawater desalination device, transportation equipment, a medium storage container and an electric heater; the seawater desalination device comprises a barrel body, a spray device arranged in the barrel body and a falling film evaporator; the transportation equipment comprises a seawater pump, a vacuum pump, a seawater spray pump, a concentrated salt water pump, a water supply pump, a circulating pump and a fresh water pump; the medium storage container comprises a fresh water tank, characterized by further comprising:
    an electrical control cabinet electrically connected to an external grid supply line and supplying power for the transportation equipment and the electric heater through a plurality of power output ends;
    a photovoltaic power generation component comprising a plurality of solar photovoltaic panels arranged in a matrix and provided with a first inverter disposed between the electrical control cabinet and the solar photovoltaic panels, wherein the alternating current output end of the first inverter is electrically connected to the electrical control cabinet and the direct current input end of the first inverter is electrically connected to the solar photovoltaic panels; and
    wind power generation components comprising a plurality of generators driven by windward impellers and provided with wind power generation controllers and second inverters in sequence between the wind power generation components and the electrical control cabinet, wherein the wind power generation controllers are used for rectifying and filtering the output current of the generators and providing direct current for the direct current input ends of the second inverters and the alternating current output ends of the second inverters are electrically connected to the electrical control cabinet.

2. The energy-saving seawater desalination device using power generated in complementary cooperation of wind energy and light energy according to claim 1, wherein the photovoltaic power generation component also comprises a direct current convergence box; the direct current convergence box is used for connecting all the solar photovoltaic panels in parallel; a positive terminal of the direct current convergence box is electrically connected with a positive terminal of the direct current input end; and a negative terminal of the direct current convergence box is electrically connected with a negative terminal of the direct current input end.

3. The energy-saving seawater desalination device using power generated in complementary cooperation of wind energy and light energy according to claim 1, wherein a battery component is connected beside the wind power generation controllers; and the battery component is used for storing electric energy emitted by a wind power generator.

4. The energy-saving seawater desalination device using power generated in complementary cooperation of wind energy and light energy according to claim 3, wherein a plurality of wind power generation components are arranged; and the second inverter and the wind power generation controller are arranged in each loop formed by each wind power generation component and the electrical control cabinet.

5. The energy-saving seawater desalination device using power generated in complementary cooperation of wind energy and light energy according to claim 4, wherein each wind power generation controller comprises a diode bridge rectifier and a filtering capacitor.

6. The energy-saving seawater desalination device using power generated in complementary cooperation of wind energy and light energy according to claim 5, wherein the energy-saving seawater desalination device using power generated in complementary cooperation of wind energy and light energy also comprises a light intensity sensor; the electrical control cabinet is provided with an electric control unit; the light intensity sensor is used for sensing the sunlight intensity; the light intensity sensor is in communication connection with the electric control unit; an electric power measuring instrument is arranged in a power supply loop between the electrical control cabinet and the wind power generation component; the electric power measuring instrument is in communication connection with the electric control unit; and the electric power measuring instrument is used for the electric control unit to obtain real-time generation power data of the wind power generation component.

7. A power supply control method of the energy-saving seawater desalination device using power generated in complementary cooperation of wind energy and light energy according to claim 6, comprising the following steps:
    S1: the electric control unit respectively senses the real-time generation power $P_{pv}$ of the photovoltaic power generation component through a signal obtained by sampling in unit time, and senses real-time light radiation intensity through the light intensity sensor; A and B are respectively set as two critical light radiation intensity values set in the electric control unit, and A is less than B;
    S2: if the real-time light radiation intensity is greater than or equal to B, the photovoltaic power generation component is connected to a power grid and supplies power for the energy-saving seawater desalination device using power generated in complementary cooperation of wind energy and light energy; if not, S3 or S5 is executed;
    S3: if the real-time light radiation intensity is greater than or equal to A and is less than B, the photovoltaic power generation component is disconnected from the power grid and then S41 or S42 is executed;
    S41: if sufficient heat is stored in a current external heat collecting device, the electric control unit issues an instruction to enable the photovoltaic power generation component to supply power for the transportation equipment in accordance with a self-matching method of output power and power load;

S42: if insufficient heat is stored in the current external heat collecting device, the electric control unit issues an instruction to enable the photovoltaic power generation component to supply power for an external electric heater only;

S5: if the real-time light radiation intensity is less than B, the photovoltaic power generation component cuts off all external power supplies.

8. The power supply control method of the energy-saving seawater desalination device according to claim 7, wherein the electric control unit senses the real-time generation power $P_{wind}$ of the wind power generation component through a signal obtained by sampling in unit time; $P_{(n)}$ and $P_{(n-1)}$ are set as generation power values of the wind power generation component sensed by two adjacent time nodes; $P_{(n)}$ is the value measured by the latter time node; E1 is set as a primary deviation threshold stored in the electric control unit and used for reflecting a value difference between $P_{(n)}$ and $P_{(n-1)}$; E2 is set as a secondary deviation threshold stored in the electric control unit and used for reflecting a value difference between $P_{(n)}$ and $P_{(n-1)}$; E1 is less than E2 if the following cases are satisfied:

if an absolute value dp of $P_{(n)}-P_{(n-1)}$ is 0, the electric control unit keeps an original PWM duty cycle waveform signal for a transmission and distribution component arranged in the electrical control cabinet;

if 0<dp<E1, the electric control unit adjusts the sampling time node into 3 times of the unit time; if dp is resumed to 0, the sampling time node is resumed into 1 time of the unit time;

if E1<dp<E2, the electric control unit adjusts the sampling time node into 5 times of the unit time, and if dp<E1 is resumed, the sampling time node is resumed into 3 times of unit time; and if dp>E2, the electric control unit issues an instruction to adjust the PWM duty cycle waveform signal for the transmission and distribution component arranged in the electrical control cabinet.

9. The power supply control method of the energy-saving seawater desalination device according to claim 7, wherein in the self-matching method of output power and power load, the loads of the energy-saving seawater desalination device using power generated in complementary cooperation of wind energy and light energy are classified into the following levels according to use frequency:

I. the loads belonging to continuous service comprise the circulating pump and the water supply pump; and $P_C$ is set as the power sum of the loads belonging to continuous service;

II. the loads belonging to intermittent operation comprise a primary effect condensate and return pump, a product water pump, an evaporator circulating pump, a cooling water discharge pump, a raw material water pump, a concentrated brine discharge pump, an overheat eliminating pump and a submersible pump; and $P_I$ is set as the power sum of the loads belonging to intermittent operation;

III. the loads belonging to operation for one time only after start comprise a water ring vacuum pump; and $P_O$ is set as the power sum of the loads belonging to operation for one time only after start;

IV. the loads belonging to ready-to-use state comprise the electric heater; and $P_B$ is set as the power sum of the loads belonging to ready-to-use state; and a $P_t$ value of the sum of the supply power of the wind power generation component and the supply power of the photovoltaic power generation component is 1.2-1.5 times of $P_C+P_I+P_O$; in control operation of closing and resuming the work of the loads at all levels in sequence, the constraint is based on the algebraic formula $P_t=N*(P_C+P_I+P_O)$; and N is any real number in an interval of 1.2-1.5.

10. The power supply control method of the energy-saving seawater desalination device according to claim 9, wherein a critical light radiation intensity value A is 200 W/m$^2$; a critical light radiation intensity value B is 500 W/m$^2$; unloading is conducted in sequence according to levels I, II and III of the use frequency of all the loads; and a plurality of loads in the same level are unloaded in sequence.

11. The power supply control method of the energy-saving seawater desalination device according to claim 7, wherein the control method comprises the following steps:

S1: the electric control unit respectively senses the real-time generation power $P_{pv}$ of the photovoltaic power generation component through a signal obtained by sampling in unit time, and senses real-time light radiation intensity through the light intensity sensor; A and B are respectively set as two critical light radiation intensity values set in the electric control unit, and A is less than B;

S2: if the real-time light radiation intensity is greater than or equal to B, the photovoltaic power generation component is connected to the battery component and supplies power for the energy-saving seawater desalination device using power generated in complementary cooperation of wind energy and light energy; if not, S3 or S5 is executed;

S3: if the real-time light radiation intensity is greater than or equal to A and is less than B, the photovoltaic power generation component is disconnected from the battery component and then S41 or S42 is executed;

S41: if sufficient heat is stored in a current external heat collecting device, the electric control unit issues an instruction to enable the photovoltaic power generation component to supply power for the transportation equipment in accordance with a self-matching method of output power and power load;

S42: if insufficient heat is stored in the current external heat collecting device, the electric control unit issues an instruction to enable the photovoltaic power generation component to supply power for an external electric heater only;

S5: if the real-time light radiation intensity is less than B, the photovoltaic power generation component cuts off all external power supplies;

in the self-matching method of output power and power load, the loads of the energy-saving seawater desalination device using power generated in complementary cooperation of wind energy and light energy are classified into the following four levels according to use frequency:

I. the loads belonging to continuous service comprise the circulating pump and the water supply pump; and $P_C$ is set as the power sum of the loads belonging to continuous service;

II. the loads belonging to intermittent operation comprise a primary effect condensate and return pump, a product water pump, an evaporator circulating pump, a cooling water discharge pump, a raw material water pump, a concentrated brine discharge pump, an overheat eliminating pump and a submersible pump; and $P_I$ is set as the power sum of the loads belonging to intermittent operation;

III. the loads belonging to operation for one time only after start comprise a water ring vacuum pump; and $P_O$ is set as the power sum of the loads belonging to operation for one time only after start;

IV. the loads belonging to ready-to-use state comprise the electric heater; and $P_B$ is set as the power sum of the loads belonging to ready-to-use state; and unloading is conducted in sequence according to levels IV, III, II and I of the use frequency of all the loads; and a plurality of loads in the same level are unloaded in sequence.

12. The power supply control method of the energy-saving seawater desalination device according to claim 11, wherein the control method comprises the following steps:

S6: the photovoltaic power generation component and the wind power generation component are operated, and step S7 or S8 is executed;

S7: if $P_{pv}>P_C+P_I+P_O$, only the photovoltaic power generation component supplies power for the transportation load and redundant electric energy is converted into heat energy through the electric heater; the wind power generation component charges the battery component;

S8: if $P_{pv}<P_C+P_I+P_O$, whether the electric heater is loaded is detected; if so, the electric heater is cut off; if not, step S9 is executed;

S9: whether the battery component has sufficient power is detected; if so, the battery component is connected; the battery component and the photovoltaic power generation component jointly supply power for the transportation load; the wind power generation component charges the battery component; redundant electric energy is converted into heat energy through the electric heater; if not, step S10 is executed; and S10: unloading is conducted in sequence according to levels IV, III, II and I of the use frequency of all the loads; and a plurality of loads in the same level are unloaded in sequence.

13. The power supply control method of the energy-saving seawater desalination device according to claim 11, wherein the control method also comprises a load adaptive control method:

the supply power and the load power are detected continuously and circularly in real time; if the sum of the supply power of the photovoltaic power generation component and the supply power of the wind power generation component is $P_t$, and the load power is $L_D=P_C+P_I+P_O+P_B$, it is assumed that the load power is changed to $L_D'$ after this adaptive control; a deviation threshold E is set on this basis; then the adaptive control needs to satisfy the following conditions:

if $P_t-L_D>E$, new loads are loaded; the sum of the power of the new loads is $L_n$, and $L_D'=L_D+L_n$, $|P_t-L_D'|<E$;

if $P_t-L_D<E$, unloading is conducted in sequence according to levels IV, III, II and I of the use frequency of all the loads; a plurality of loads in the same level are unloaded in sequence; the sum of the power of the unloaded loads is $L_X$; and $L_D'=L_D-L_X$, $|P_t-L_D'|<E$; and if $|P_t-L_D|<E$, then $L_D'=L_D$.

* * * * *